(12) United States Patent
Hsieh et al.

(10) Patent No.: US 6,909,549 B1
(45) Date of Patent: Jun. 21, 2005

(54) TUNABLE FILTER FOR OPTICAL ADD/DROP MODULE

(76) Inventors: Yung-Chieh Hsieh, 3176 Salem Dr., San Jose, CA (US) 95127; Chiayu Ai, 37057 Chestnut St., Newark, CA (US) 94560; Hong Li, 4127 Lilac Ridge Rd., San Ramon, CA (US) 94583; Dar-Yuan Song, 14 Santa Comba, Irvine, CA (US) 92614

( * ) Notice: Subject to any disclaimer, the term of this patent is extended or adjusted under 35 U.S.C. 154(b) by 107 days.

(21) Appl. No.: 10/384,122

(22) Filed: Mar. 6, 2003

Related U.S. Application Data

(60) Provisional application No. 60/362,650, filed on Mar. 8, 2002.

(51) Int. Cl.$^7$ .............................................. G02B 27/00
(52) U.S. Cl. ...................... 359/578; 359/583; 359/589; 359/494; 359/497
(58) Field of Search ................................. 359/578, 580, 359/583, 584, 589, 498, 497, 494

(56) References Cited

U.S. PATENT DOCUMENTS

2002/0145803 A1 * 10/2002 He et al. .................... 359/498

* cited by examiner

Primary Examiner—Fayez G. Assaf
(74) Attorney, Agent, or Firm—Antonio R. Durando; Quarles & Brady Streich Lang LLP

(57) ABSTRACT

A tunable filter includes a polarizing beam splitter and a half-wave plate that produce two equally polarized beams from an arbitrarily polarized input light. The polarized beams are directed toward a tunable component that consists of an optical substrate coated with a filter and a reflective element on its back and front surface, respectively. The pass and stop beams emerging from the tunable component are retro-reflected by roof structures and passed again through the filter. As a result of this combination of components, the filter's performance is not dependent on polarization and the filter's output channels are not shifted or deviated by tuning.

30 Claims, 11 Drawing Sheets

TUNABLE FILTER FOR OPTICAL ADD/DROP MODULE

RELATED APPLICATIONS

This application is based on U.S. Provisional Ser. No. 60/362,650, filed Mar. 8, 2002.

BACKGROUND OF THE INVENTION

1. Field of the Invention

This invention pertains to the general field of optical filters and, in particular, to a tunable optical filter with improved spectral performance and undeviated pass and stop beams.

2. Description of the Prior Art

Optical filters are widely used as components of optical systems. In particular, they are employed in optical communication systems, where information is transmitted along the same optical path at different wavelengths $\lambda$ of light (channels). In order to retrieve information contained in a particular channel, the signal wavelengths have to be spectrally separated. Similarly, in order to add a particular channel to the stream of optical information, a spectral addition of a particular wavelength is often required. These functions have been traditionally accomplished with the use of optical add/drop modules (OADMs, also generally known as optical multiplexers and de-multiplexers) performing what is known in the art as wavelength division multiplexing (WDM). This is achieved in principle using various optical filters that pass at least a portion of the input light within a predetermined spectral range and reflect (stop) at least a portion of the light within another spectral range.

The application requirements of increasingly more complex optical systems are driving this technology towards more flexible and reconfigurable arrangements where the wavelengths of pass/stop channels (otherwise also referred to in the art as add/drop channels) may be varied at the request of the user. This can be accomplished by arranging the optical add/drop modules and the optical filters they are based upon in a tunable fashion.

A wide variety of tunable optical filters is known in the art, the most fundamental one being a simple thin-film filter fabricated by depositing a thin-film stack on a suitable substrate. Almost all thin-film optical coatings depend, at least in part, on interference for their operation. Therefore, the spectral characteristics of such filters are determined by the mixture of intrinsic optical properties of the filter materials (such as reflectance, transmittance, absorptance) and by their geometric arrangement (thickness, for instance).

Spectral tuning of a filtering function (or spectral shifting of the peak wavelength of the pass/stop bands of a filter) in such a tunable filter can be provided merely by varying the angle of incidence of the input light beam (defined and measured with respect to the normal to the surface of the filter). As is well known in the art, variation of the angle of incidence of the input light is most easily accomplished by the physical rotation of the thin-film filter with respect to the incident light, as shown in FIG. 1. For convenience, a system of Cartesian coordinates is provided as a reference throughout this disclosure.

The conventional tunable thin-film optical filter 1 illustrated in FIG. 1 is composed of a suitable, transparent, filter substrate 12 with optical quality front and back surfaces, 14 and 16, respectively, that are parallel to each other, and of a thin-film structure F. Thus, the substrate 12 is a plane-parallel optical plate. The thin-film structure F is deposited on at least part of the front surface 14 of the substrate 12 using one of well-known techniques, for example electron-beam deposition. The back surface 16 of the substrate 12 may be appropriately AR-coated to suppress residual reflections. The filter 1 may be positioned in air.

A generally non-monochromatic collimated input beam of light I is delivered toward the front surface 14 along the z axis at an oblique angle of incidence $\theta$. Some spectral components of the beam I are transmitted through the thin-film filter 1 according to its spectral characteristics and produce the pass beam P. Some other spectral components of the beam I are reflected by the filter 1 in the form of the stop beam S. As shown in FIG. 1, both the pass and stop beams are shifted with respect to the input beam I. Those skilled in the art readily understand that the pass beam P is laterally shifted with respect to the incident beam I by a distance that depends on the thickness d of the substrate and the refractive index n. Similarly, the stop-beam S is angularly deviated with respect to the input beam I according to Snell's law.

In a thin-film narrow-band filter, the peak wavelengths of its pass band and stop band are proportional to the effective phase thickness of the filter. A filter rotation around an axis that is parallel to the x-axis, as shown in FIG. 1, from the initial angle of incidence $\theta$ to another angle of incidence $\theta'$ changes the effective phase thicknesses that various spectral components of the incident light experience upon traversing the thin-film stack. This, in turn, produces the desired spectral shift (tuning) of the filter characteristics and yields new pass and stop beams, P' and S', respectively. For small rotation angles, this is the principal effect.

However, several complicating effects limit the degree to which this tuning mechanism can be utilized in a practical optical system. First, at oblique angles of incidence, the filter function is strongly dependent on the state of polarization of the incident light. Such polarization dependence detrimentally affects the performance of most optical systems and thus is extremely undesirable. Further, at oblique incidence and larger rotation angles, even when the polarization state of the incident light is well controlled, the change in optical admittances of thin-film layers comprising the filter starts to affect the effective phase thickness of the filter. In practice, the performance contribution of high-index layers is affected less than that of low-index ones, thereby causing a split of filtering characteristic for a given plane of polarization, with attendant degradation of performance. Finally, due to the angular rotation of the filter, the direction of the reflected beam (the stop channel S in FIG. 1) is constantly changing according to Snell's law, as is the transverse shift of the transmitted beam (the pass channel P in FIG. 1). This necessarily complicates the basic system design required to achieve an accurate detection of the pass and stop channels of an optical system.

To the extent that tilting or rotation of the thin-film filter is necessary to the function of the tunable filter, these drawbacks are unavoidable as long as the incident light is not linearly polarized, and as long as the useful outputs (the pass and stop beams) are collected in separate reflected and throughput paths of the apparatus. Thus, there remains a need for a tunable filter that overcomes the severe limitations described above.

SUMMARY OF THE INVENTION

This invention provides a novel tunable thin-film filter with improved spectral performance and undeviated pass and stop beams. According to one aspect of the invention, the optical train of the tunable thin-film filter system is arranged in such a way as to attain a single polarization state in the light incident on the thin-film filter component. This is achieved by transforming a quasi-collimated arbitrarily polarized input light into a linearly polarized light prior to its arrival to the thin-film filter by using a combination of a polarizing beam splitter and a half-wave plate. As the two beams that passed through the polarizing beam splitter have mutually orthogonal linear polarizations, the half-wave plate, inserted in the optical path of one of the beams, rotates the corresponding polarization vector which results in both beams arriving at the thin-film filter component in the same polarization state. This in turn greatly reduces the polarization dependence of the performance of the tunable filter.

According to another aspect of the invention, the tunable component of the filter system consists of two thin-film coatings formed on portions of a translucent plane-parallel substrate with optical quality surfaces. The first thin-film coating structure cover a portion of the back surface of the substrate. It filters the light arriving at it through the front surface and the body of the substrate by passing a fraction and reflecting another fraction of the light, thereby producing the pass and stop channel beams of the device. The substrate is rotatably mounted to provide tuning in conventional manner. The second thin-film coating structure, placed on a portion of the front surface of the substrate, completely reflects the stop channel beam back to the substrate's back surface, where the stop beam emerges from the coated substrate. Thus, the input light is spectrally and spatially separated by the thin-film filter component into pass and stop beams that emerge from the substrate's back surface. As is well known in the art, a basic invariant property of any collimated beam of light passing through a plane-parallel plate positioned in air is that the beam remains collinear to its initial direction of propagation. Thus, both throughput beams remain parallel to the light incident on the substrate's front surface and tuning by angular rotation of the thin-film filter component of the invention does not result in an angular deviation of either throughput beam.

According to yet another aspect of the invention, retro-reflecting components are positioned in the optical paths of the beams that emerge from the tunable thin-film filter. The beams are retro-directed along lines parallel to their prior optical paths and traverse the thin-film filter component, the half-way plate, and the polarizing beam splitter for a second time in reverse fashion. The beams' second passing through the tunable filter results in compensation of the original lateral shift introduced by the tunable filter, as well as in improvement of their spectral content. The use of optical roof structures as the retro-reflectors in the preferred embodiment of the invention leads to advantageous spatial separation of the input, pass and stop channels at the throughput of the tunable filtering system. The use of a planar mirror and a roof structure as the retro-reflectors in an alternative embodiment of the invention leads to spatial overlap between the input and the pass or the stop channels, and an optical circulator is employed for channel separation.

Various other advantages will become clear from the description of the invention in the specification that follows and from the novel features particularly pointed out in the appended claims. Therefore, to the accomplishment of the objectives described above, this invention consists of the features hereinafter illustrated in the drawings, fully described in the detailed description of the preferred embodiments, and particularly pointed out in the claims. However, such drawings and descriptions disclose only some of the various ways in which the invention may be practiced.

DETAILED DESCRIPTION OF THE INVENTION

The invention is directed at providing a tunable thin-film filter system which overcomes the drawbacks of the prior-art configurations. Specifically, the dependence of the filter's spectral performance on the state of polarization of the input light and the spatial deviations of the channel beams due to filter rotation are eliminated. In addition, stronger spectral filtering of the input light is provided in a cost-efficient way.

In the following description of optical trains (which in the context of this invention are defined as sets of one or more optical elements performing the required optical functions), the loss of light on residual reflections at interfaces, on absorption in materials, and on scattering is of little relevance to the subject matter of the invention; thus, a discussion of these residual losses is omitted. In practice, they can be dealt with in conventional manner by providing an adequate level of AR-coating on corresponding optical surfaces and by choosing appropriate materials that are translucent in the spectral ranges of interest. Similarly omitted is a discussion of the power ratio (or power splitting) between the various beams within the system, which in practice can be adjusted by an appropriate opto-mechanical design.

Figure 2A:
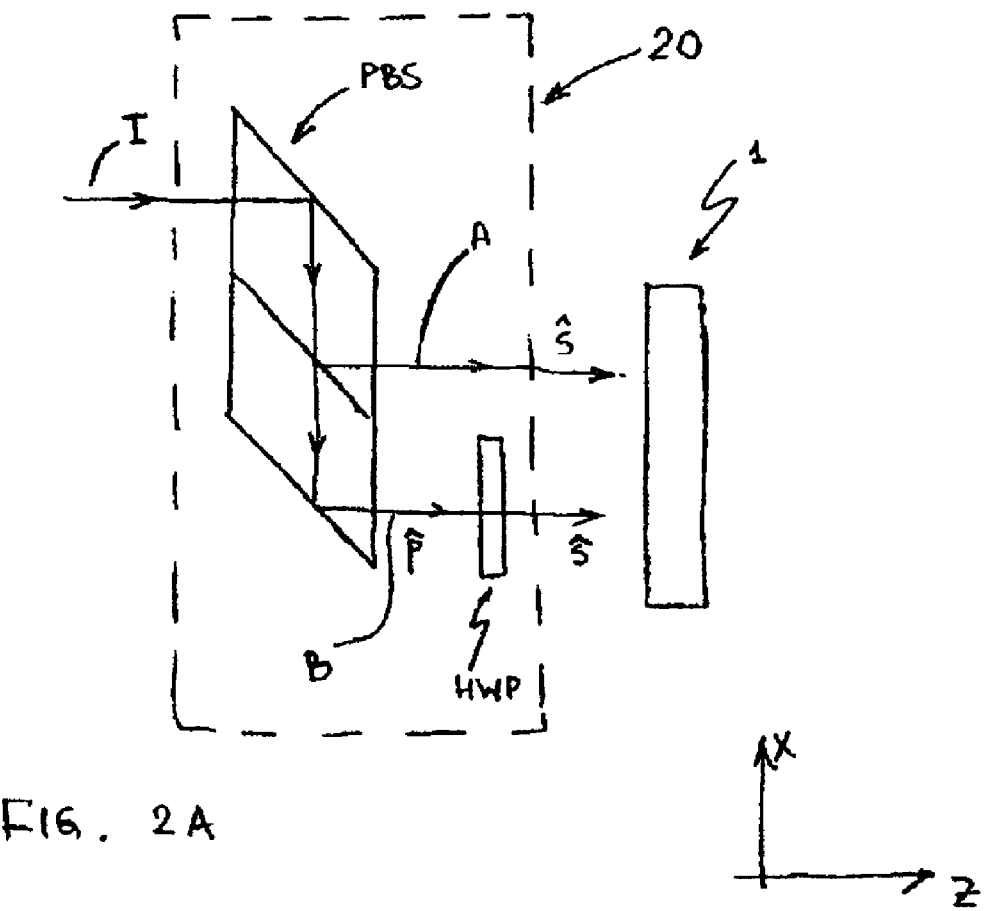
FIG. 2A is a schematic representation of the polarization converter of a mechanically tunable optical thin-film filter system according to the invention that utilizes a polarizing beam splitter to establish a single state of polarization (s- or p-) for the light incident on a thin-film filtering component.

Referring to the figures, wherein like parts are designated with like numerals and symbols, FIG. 2A illustrates schematically a polarization converting component 20 used in the preferred embodiment of the invention to transform a collimated input beam of light I of arbitrary polarization into a linearly polarized light for further delivery to a tunable thin-film filter 10. As illustrated, the preferred configuration of the polarization converter 20 consists of a polarizing beam splitter PBS and a half-wave plate HWP, both of which are achromatic within the spectral region of operation of the tunable filter. As is well known in the art, the polarizing beam splitter divides the input beam I into two output beams A and B with mutually orthogonal linear polarizations, s- and p-polarizations, which are separated in space by a distance that depends on the geometry of the beam-splitter. The half-wave plate is inserted in the optical path of one of the beams in order to rotate the corresponding polarization vector (p-polarization, for example, in FIG. 2A) by 90°, which results in two beams of equal spectral content arriving at the tunable thin-film filter component 10 in the same polarization state.

Figure 2B:
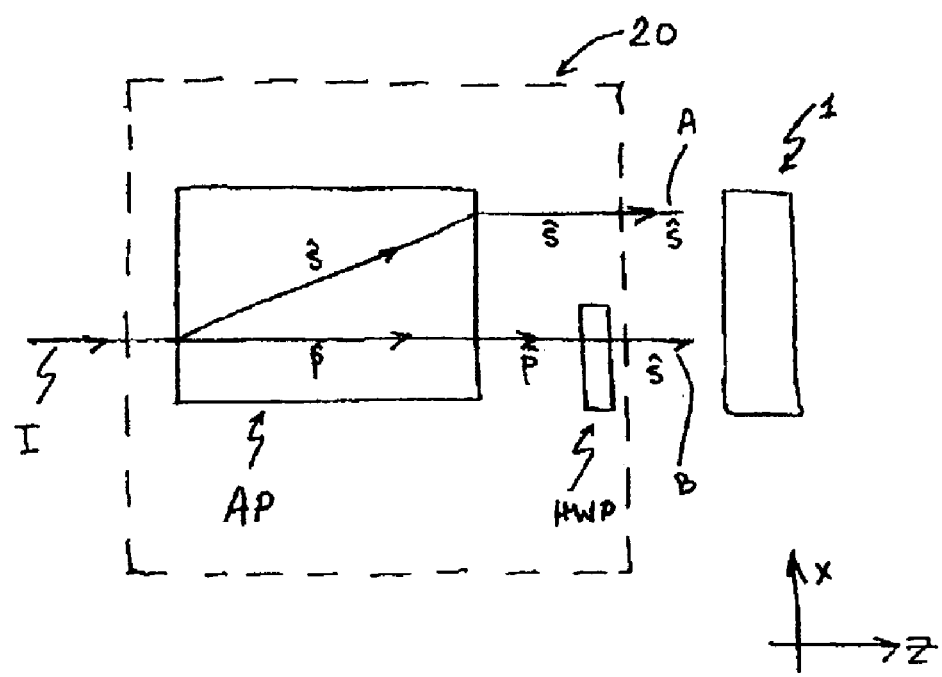
FIG. 2B is a schematic representation of an alternative polarization converter of the mechanically tunable optical thin-film filter system of the invention that utilizes an anisotropic crystal to establish a single state of polarization (s- or p-) for the light on a thin-film filtering component.

The required polarization transformation may be achieved equivalently by other means, for example by using a so-called beam "walk-off" element AP made of an appropriately shaped anisotropic crystal, also paired with a half-wave plate HWP, as shown in FIG. 2B. Again, two beams A and B of equal linear polarization and equal spectral content emerge from the polarization converter 20, propagate in the xz-plane parallel to the z-axis, and impinge upon the tunable filter 10. Thus, the spectral performance of the tunable filter is not affected by the polarization state of the input light.

Figure 3:
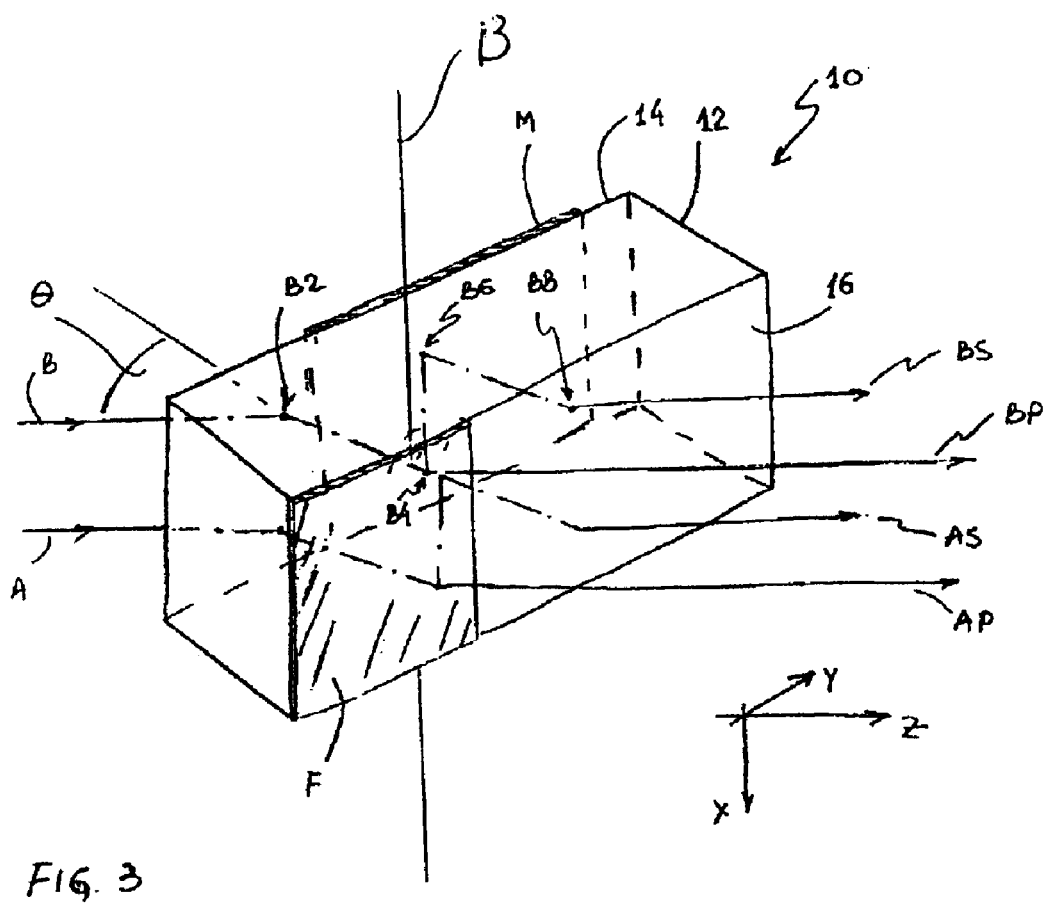
FIG. 3 is a three-dimensional view of a tunable thin-filtering component according to the invention, which delivers stop and pass channel beams as a throughput to eliminate angular deviation due to filter tuning in the stop channel beam.

Referring to FIG. 3, which illustrates the preferred embodiment of a tunable thin-film filter 10 according to the invention, the generally oblique angle of incidence θ of the linearly polarized beams A and B onto the tunable filter 10 is defined by the design and the range of operation of the tunable filter. A substrate 12 of the tunable filter 10 is made of translucent material, for example glass, and it is defined by the optical quality of the front and back surfaces, 14 and 16, respectively.

A thin-film filter coating F is deposited on at least a portion of the back surface 16 of the substrate 12, and it serves to spectrally separate pass and stop wavelengths of incident light. Another, reflecting, thin-film coating or mirror M is formed on the front surface 14 of the tunable filter substrate 12, and it serves to re-direct the stop channel beam through the substrate so as to deliver it as a throughput of the tunable filter. As illustrated in FIG. 3, the extent of the coatings F and M is generally limited along the y-axis and is defined by the geometry of the filter 10 and the incident angle θ.

With reference to the coordinates indicated in the drawings, the beams A and B that emerge from the polarization converter 20 (FIG. 2) are incident onto the tunable filter 10 along the z-axis. The beam B refracts at point B2 on the front surface 14 of the substrate 12 where it is not covered with coating M, and it propagates towards point B4 on the coated back surface 16, where a fraction of the beam (defined as the stop channel beam) is reflected by the coating F towards the coated point B6 on the front surface. At point B6, the mirror M re-directs the stop channel beam through the substrate of the filter towards the uncoated point B8, where it emerges as a throughput beam BS of the tunable filter 10. Another fraction of the incoming beam B, which is transmitted by the coating F at point B4, forms the pass channel beam BP, also as a throughput of the tunable filter.

The behavior of the input beam A is analogous to that of the beam B. Thus, due to the presence of the two thin-film coatings F and M, four beams emerge from the tunable filter 10 parallel to the z-axis (two pass-channel beams, AP and BP, and two stop-channel beams, AS and BS). All beams have the same linear polarization, and their spectral contents are defined as pass-bands and stop-bands by the filtering characteristics of thin-film structure F. The pass channel beams AP and BP define a plane parallel to the xz-plane, while the stop channel beams AS and BS define another plane also parallel to the xz-plane, as shown in FIG. 3. The substrate 12 is mounted so as to provide tuning in conventional manner due to rotation around an axis 13 perpendicular to the plane of incidence of beams A and B on the tunable filter 10 (axis 13 is parallel to the x-axis in FIG. 4).

Figure 4:
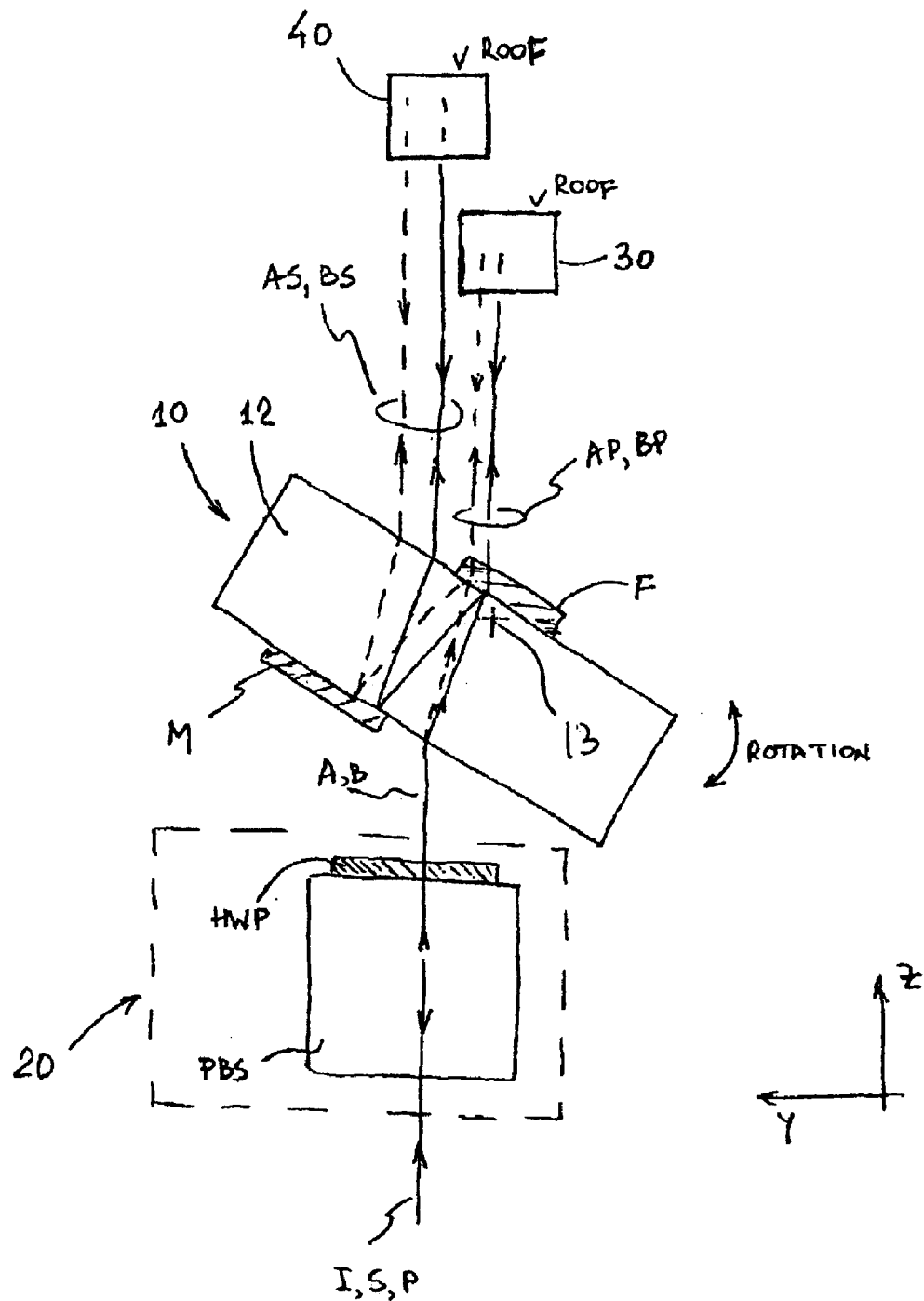
FIG. 4 illustrates in side view the preferred embodiment of a three-port tunable thin-film filter system with right-angle prisms used for retro-reflection of light. The dashed lines show the beam paths after rotation of the filter.
Figure 5:
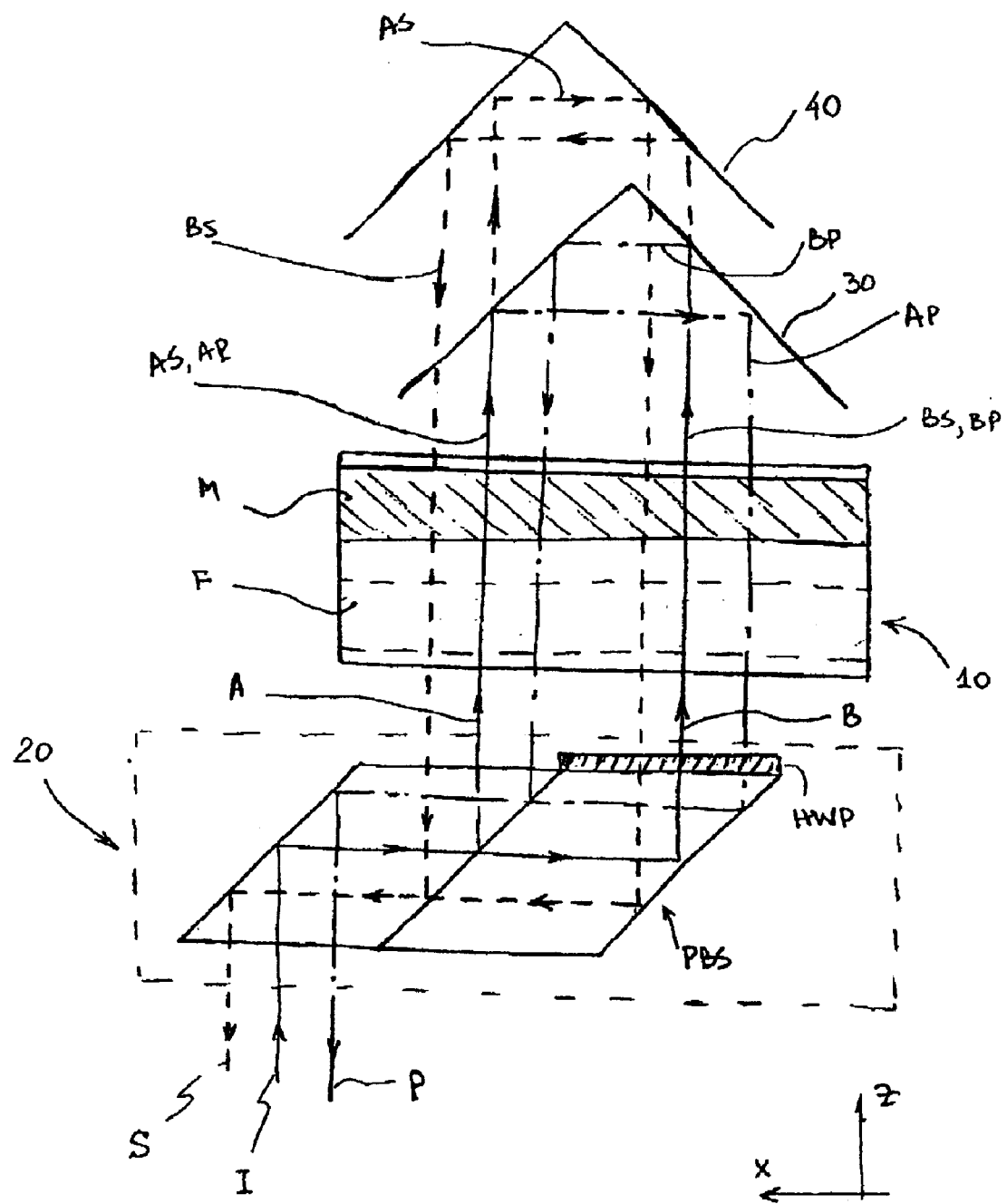
FIG. 5 is a top-view of the embodiment of FIG. 4.

FIGS. 4 and 5 describe in side and top views, respectively, the preferred embodiment of the tunable filter system of the invention arranged as a three-port optical add/drop modules. As shown in FIG. 5, the arbitrarily polarized input beam I propagating in the z direction is separated into the two beams A and B with identical spectral content and polarization by the polarization converter 20, which, as described above, consists of the polarizing beam splitter PBS and the half-wave plate HWP. The half-wave plate is preferably integrated with one of the prisms of the beam splitter to simplify optical alignment. Alternatively, the half-wave plate and the polarization beam splitter may be employed as two stand alone components.

As would be clear to one skilled in the art, the lateral separation between the beams A and B is defined by geometry of the polarization converter 20. The coatings of the tunable filter 10 are arranged on a substrate 12 according to the description of FIG. 3 above, and the filter is appropriately mounted to provide rotation in the yz-plane about an axis parallel to the x-axis, as illustrated in FIG. 4. Referring to both FIGS. 4 and 5, upon propagating through the tunable filter, both beams A and B are split into pairs of pass and stop beams (AP and AS, BP and BS, respectively) which are collinear to but laterally shifted from the beams A and B. The figures depict the beams emerging from the tunable filter 10 (pass and stop beams AP, BP, AS and BS).

Two roof retro-directing structures, represented for example by a pair of right-angle prisms 40 and 30 with appropriate reflective coatings, are positioned in the optical paths of each pair of pass and stop beams in such a way that the apex line of each prism (defined as the intersection of the two reflective surfaces for the purposes of this disclosure, and denoted as roof lines in FIG. 4) is perpendicular to the plane defined by the corresponding pair of pass and stop beams (AP,BP or AS,BS, as applicable) and is parallel to the planes defined by each pair of pass and stop beams (AP,AS and BP,BS). In FIG. 5 this orientation corresponds to the prisms' apex lines being parallel to the y-axis of the coordinate system.

The prisms 30 and 40 retro-reflect the two pass channel beams AP and BP and the two stop channel beams AS and BS in the z direction. Thus, as can best be seen from FIG. 5, the lateral shift of the pass and stop beams due to their initial propagation through the tunable filter 10 is compensated upon their second traversing of the filter after retro-reflection by the prisms 30 and 40. As would be clear to one skilled in the art, the dimensions and lateral positioning of the prisms 30 and 40 with respect to the rest of the optical train are selected such as to provide re-combination of the two pass channel beams AP and BP, as well as the two stop channel beams AS and BS, upon their reverse propagation through the polarization converter 20, into a single stop channel S and a single pass channel P. The stop and pass channels S and P that define the output of the tunable filter system are collinear and coplanar with the input channel I, as shown in FIGS. 4 and 5, and are laterally separated from one another by a distance dependent on the geometry of the polarization converter 20, which simplifies the optical pick-up and detection.

Figure 1:
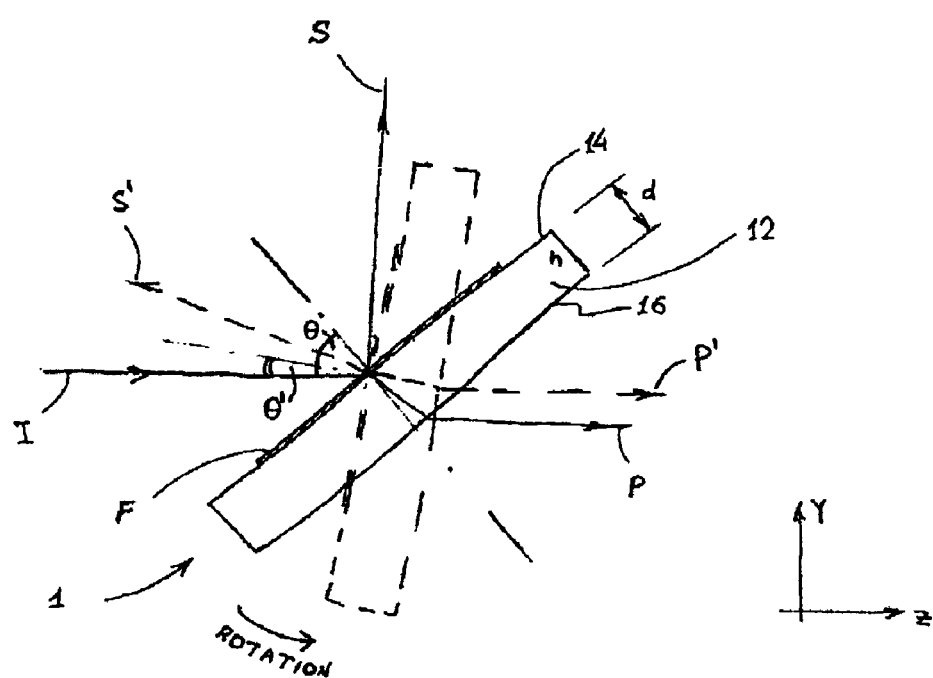
FIG. 1 illustrates schematically the principle of operation of a conventional mechanically tunable optical thin-film filter.

Spectral tuning of the filter system is accomplished in conventional manner (see FIG. 1) by rotating the tunable filter 20 around an axis parallel to the x-axis, as shown in FIG. 4. Although the position of the tunable filter after rotation is not illustrated, the dotted arrows in FIG. 4 depict the optical paths of the pass beams AP and BP and the stop beams AS and BS through the optical train after rotation is accomplished. As can be easily understood, the lateral shifts of the beams are again compensated due to retro-reflection of the beams by the prisms 30 and 40 and the reverse propagation through the tunable filter 10.

Figure 6:
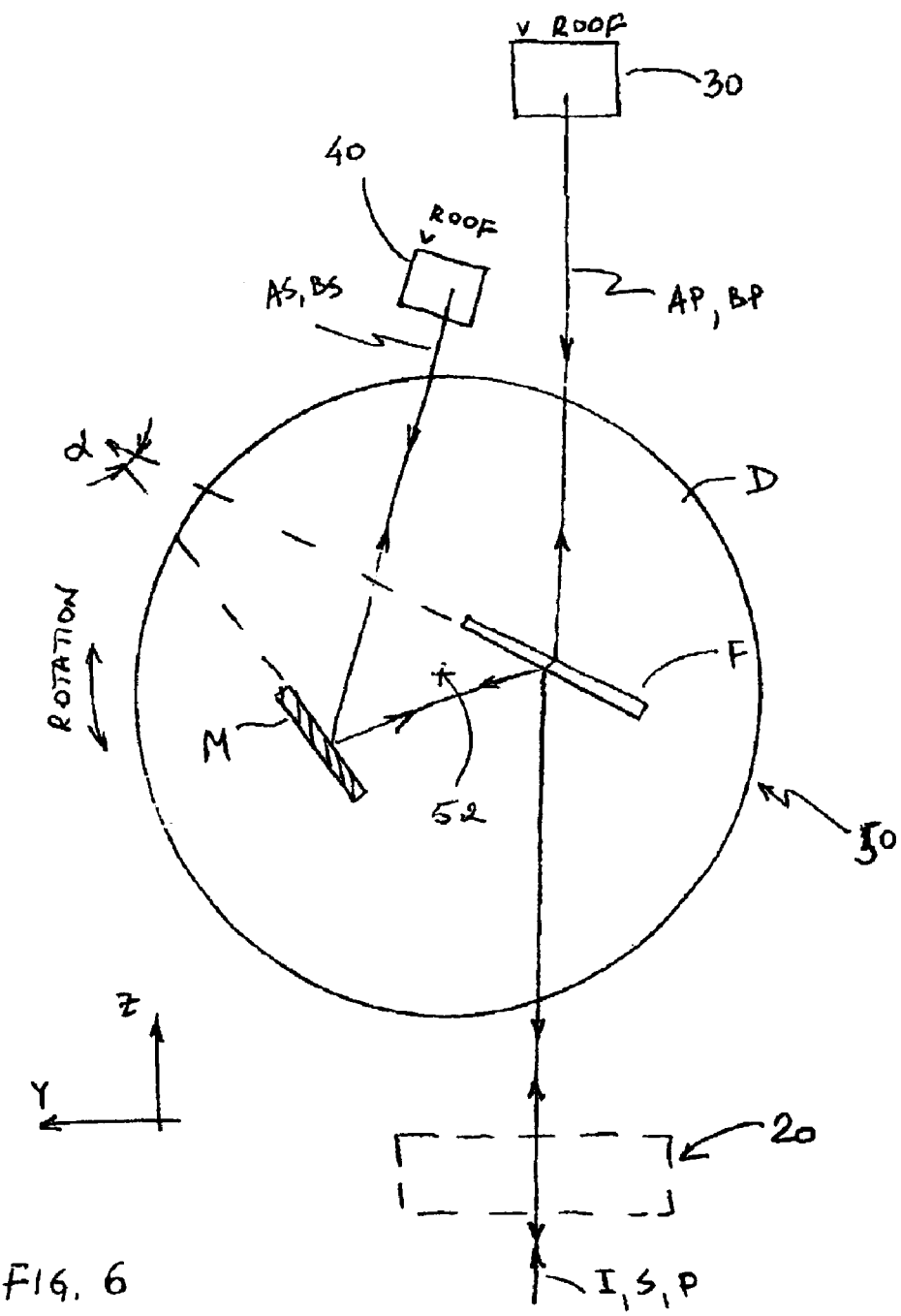
FIG. 6 illustrates in side view an alternative embodiment of the three-port tunable thin-film filter system of the invention with a tunable filter composed of separate components.

It is clear that various changes in the components and steps that have been described may be made by those skilled in the art within the scope of the invention illustrated herein. For example, the three-port OADM of FIGS. 4 and 5 could be modified as illustrated in FIG. 6 to produce the same functional result. Instead of utilizing a single-component tunable filter 10, two separate filter and mirror components F and M, mounted on a rotating structure, such as a support disk D, at a fixed predetermined angle a with respect to one another, may be used in equivalent fashion. In this embodiment 50 of the invention, the spectral separation of the pass and stop beams occurs in air, and the stop beams are not collinear with the pass beams. To provide the proper retro-reflection of the beams along the optical train, the requirements for the position of the right-angle prisms 30 and 40 remain the same as described above. Namely, the apex line of each prism (denoted as roof lines in FIG. 6) must be perpendicular to the plane defined by the corresponding pair of pass and stop beams (AP,BP or AS,BS, as applicable), and must be parallel to the planes defined by each pair of pass and stop beams (AP,AS and BP,BS).

The tuning of the filter 10 in the embodiment of FIG. 6 is similarly provided, for example, by rotation of the support disk D (and the mirror and filter surfaces M,F mounted in normal disposition to the disk) around an axis 52 perpendicular to the apex lines of the prisms 30,40. Of course, this embodiment requires a corresponding rotation of the prism 40 to maintain the attitude described above for the stop beams. Preferably, the rotation axis 52 is arranged so that the incidence point at the filter surface F remains unchanged during the rotation. This will be achieved then the axis 52 is near the point where the input beam I intersects the filter surface F.

Moreover, as illustrated in FIG. 6, the filter and mirror components F,M are perpendicular to the disk D, but they could be combined with the disk in equivalent manner positioned at any predetermined respective angles relative to the disk. In that case, appropriate adjustments would have to be made to the position of the prisms 30 and 40 to ensure that they intercept the pass and stop beams, respectively.

Figure 7A:
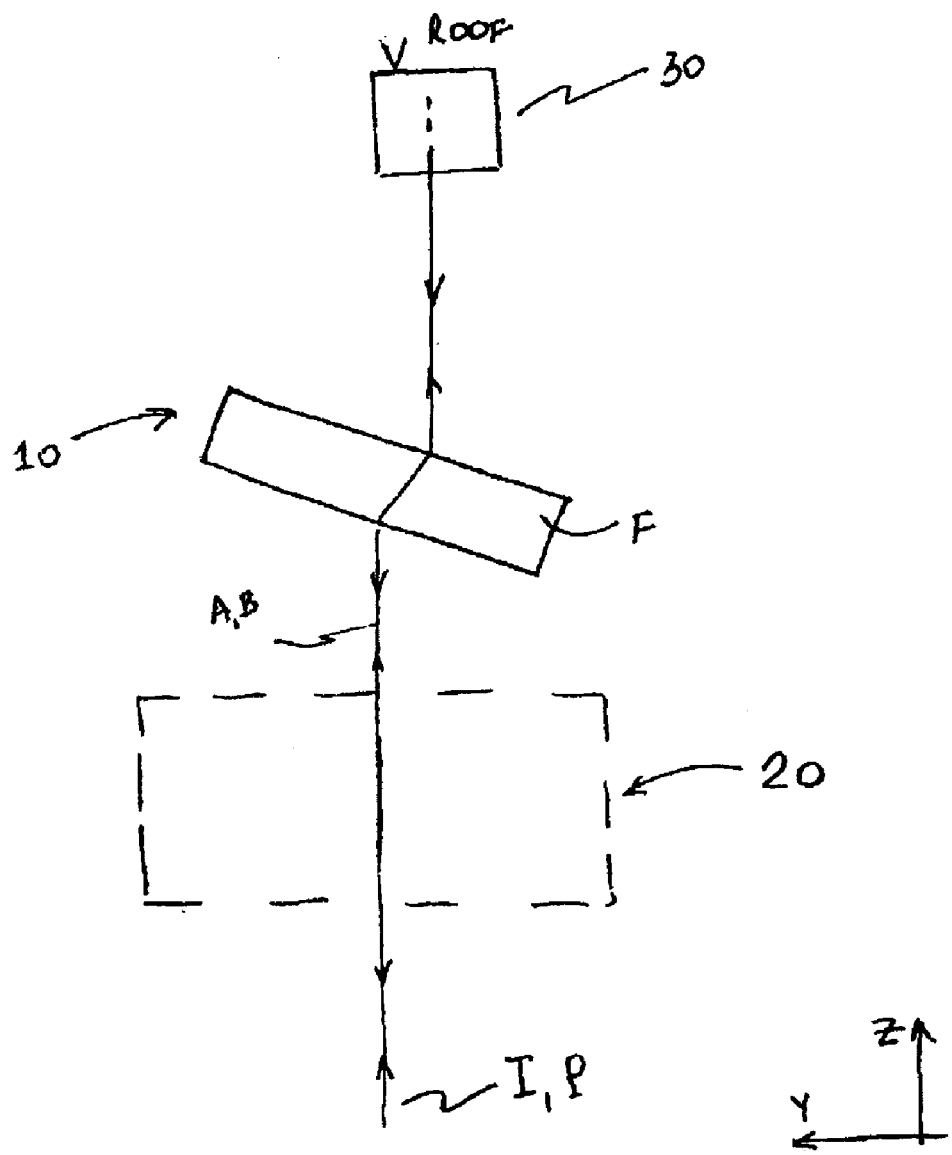
FIG. 7A illustrates in side view an alternative embodiment of the invention consisting of a two-port tunable thin-film filter system with a single right-angle prism used for retro-reflection of the light.
Figure 7B:
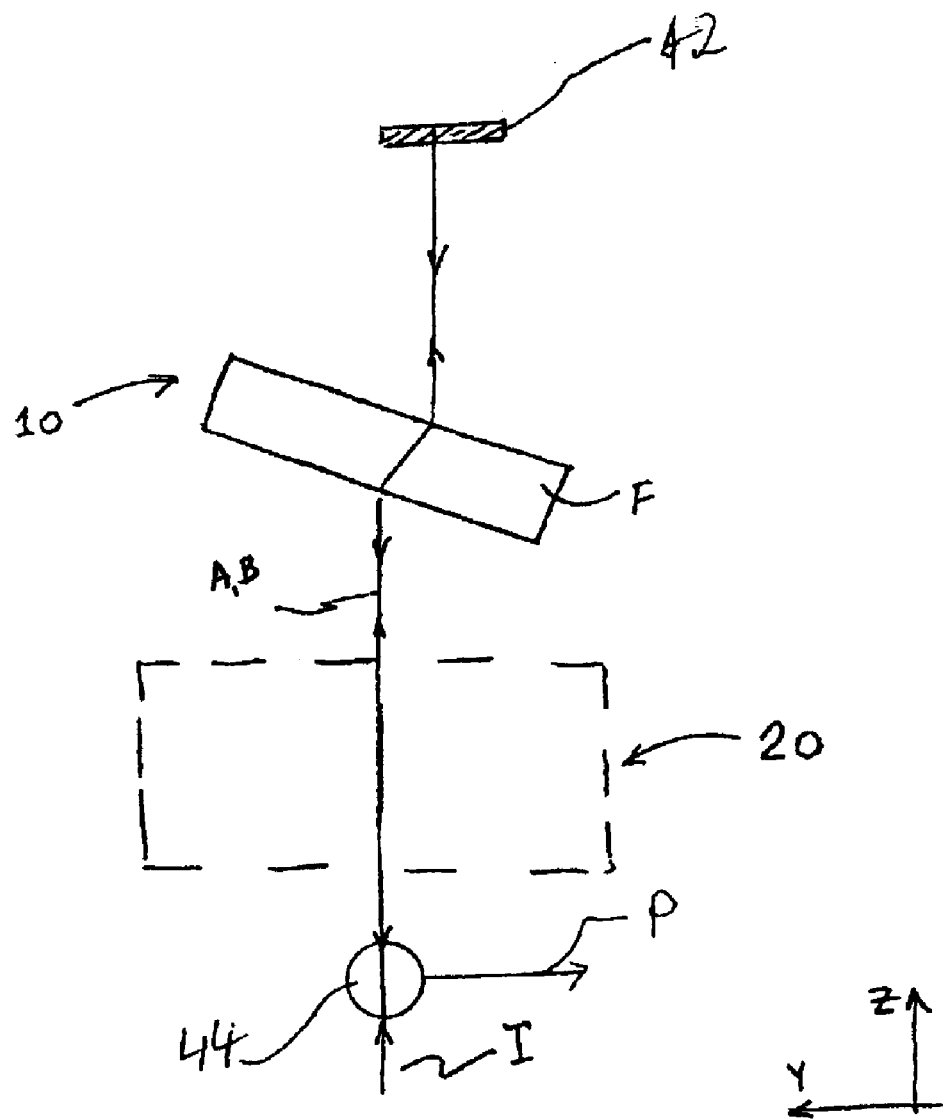
FIG. 7B illustrates in side view an alternative embodiment of the invention consisting of a two-port tunable thin-film filter system with a single mirror used for retro-reflection of the light and a circulator to operate the pass beam.
Figure 8:
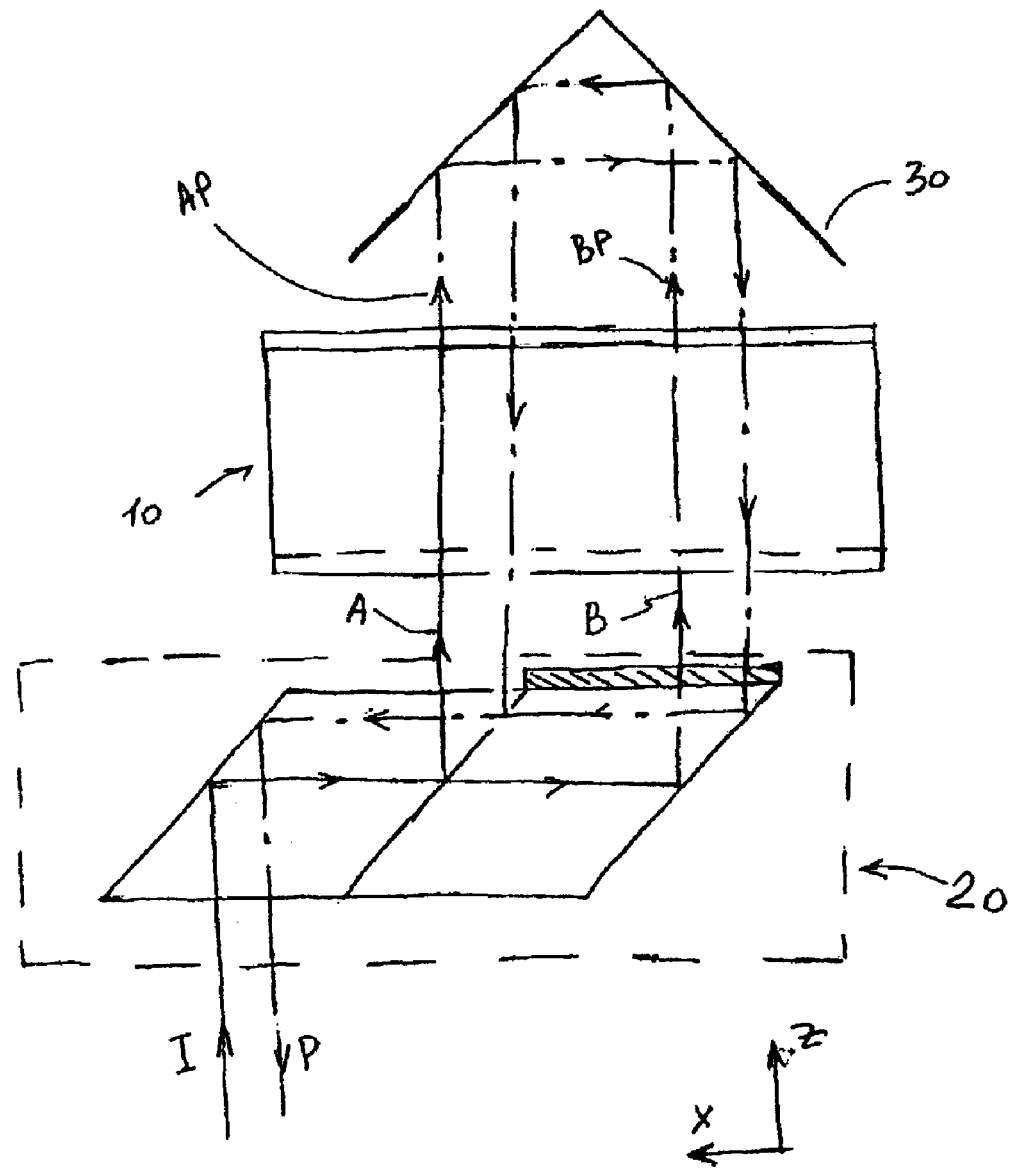
FIG. 8 is a top view of the embodiment of FIG. 7.

As can be understood by the one skilled in the art, in the absence of the mirror M in the optical train of the tunable filter system, only the pass channel may be utilized. Thus, the tunable filter system may be utilized as a two-port device to drop any channel, as shown in FIGS. 7A and 8, and only one right-angle roof retro-reflector is necessary to compensate for the lateral shift of the pass channel beam. FIG. 7B illustrates a two-port embodiment where a mirror is used instead of a roof and a circulator 44 is used to operate the pass beam.

Figure 9:
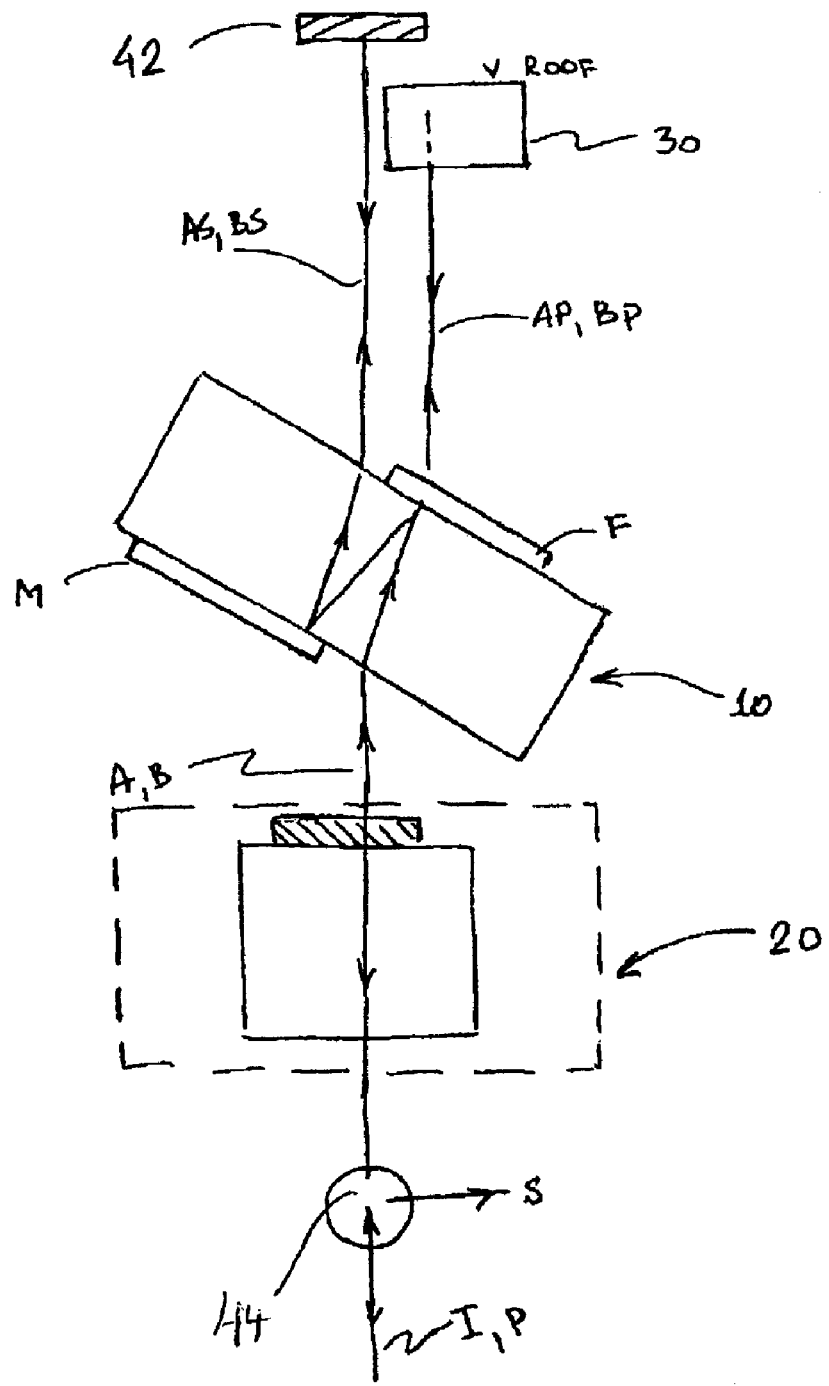
FIG. 9 illustrates in side view an alternative embodiment of the three-port tunable thin-film filter system of the invention with a right-angle prism and a planar mirror used for retro-reflection of light in the pass and the stop channels, respectively, and an optical circulator used for output light channel separation.

In an alternative three-port tunable OADM embodiment of the invention, illustrated in top view in FIG. 9, one of the channels of the tunable filter 10 (the stop channel is shown in FIG. 9, but it could equivalently be the pass channel) is retro-reflected by a planar mirror 42 instead of the right-angle prism 40 (with reference to FIG. 4). In this configuration the output stop channel overlaps with the input channel, and an optical circulator 44 is used for spectral channel separation.

In all the embodiments described above, the stop and pass channel beams traverse the tunable filter component twice, first in their propagation down the optical train and then again upon retro-reflection in the opposite direction. Therefore, the spectral separation of the filter is improved with respect to conventional tunable filters. Moreover, because the beams may be recombined prior to delivery at the output channels, intensity losses are minimized.

As illustrated by these embodiments, the invention provides a simple and precise control of the optical paths and an improved spectral content of the optical channels, and it may be implemented easily and at low cost of manufacture using conventional components in any optical device. As would be clear to one skilled in the art, changes can be made with equivalent results. For example, the front and back surfaces of the substrate 12 need not be parallel, nor is a substrate necessary, as illustrated by the embodiment of FIG. 6. Moreover, while the optical element M has been described as a mirror, which is greatly preferred, it is understood that any optical surface capable of reflecting light at least in part could be used to practice the invention, subject to a corresponding loss of energy.

Thus, while the invention has been shown and described in what is believed to be the most practical and preferred embodiments, it is recognized that appropriate deviations can be made within the scope of the disclosure. Therefore, the invention is not to be limited to the disclosed details, but is intended to embrace all equivalent structures and methods.

We claim:

1. A tunable optical filter comprising:
    filter element positioned along an optical path of an incident light beam;
    a reflective element positioned at a predetermined fixed angle with respect to the filter element along an optical path of an intermediate stop beam produced by reflection of a portion of the incident light beam on the filter element; and
    means for rotating said filter and reflective element to vary an angle of incidence of said incident light beam, thereby allowing tuning of the optical filter.

2. The filter of claim 1, wherein said filter element is affixed to a back surface of a transparent substrate, and said reflective element is affixed to a front surface of the substrate.

3. The filter of claim 2, wherein said filter and reflective elements are parallel to each other.

4. The filter of claim 1, wherein said filter and reflective elements are parallel to each other.

5. The filter of claim 1, further comprising means for polarizing said incident light beam prior to incidence on the filter element.

6. The filter of claim 5, wherein said polarizing means includes a polarizing beam splitter combined with a half-wave plate, whereby said incident light beam is split into two equally polarized incident beams of predetermined polarization.

7. The filter of claim 6, wherein said filter element is positioned along an optical path of each of said two equally polarized incident beams, and said reflective element is positioned along an optical path of an intermediate stop beam produced by reflection of a portion of each of said two equally polarized incident beams on the filter element.

8. The filter of claim 5, wherein said polarizing means includes an anisotropic crystal combined with a half-wave plate, whereby said incident light beam is split into two equally polarized incident beams of predetermined polarization.

9. The filter of claim 8, wherein said filter element is positioned along an optical path of each of said two equally polarized incident beams, and said reflective element is positioned along an optical path of an intermediate stop beam produced by reflection of a portion of each of said two equally polarized incident beams on the filter element.

10. The filter of claim 5, further comprising first means for retro-reflecting a pass beam produced by transmission through the filter element of a portion of the incident light beam; and second means for retro-reflecting a throughput stop beam produced by reflection of said intermediate stop beam on the reflective element.

11. The filter of claim 1, further comprising first means for retro-reflecting a pass beam produced by transmission through the filter element of a portion of the incident light beam.

12. The filter of claim 11, wherein said first retro-reflecting means includes an optical roof element.

13. The filter of claim 1, further comprising second means for retro-reflecting a throughput stop beam produced by reflection of said intermediate stop beam on the reflective element.

14. The filter of claim 13, wherein said second. retro-reflecting means includes an optical roof element.

15. The filter of claim 1, further comprising first means for retro-reflecting a pass beam produced by transmission through the filter element of a portion of the incident light beam; and second means for retro-reflecting a throughput stop beam produced by reflection of said intermediate stop beam on the reflective element.

16. The filter of claim 15, wherein each of said first and second retro-reflecting means includes an optical roof element.

17. A tunable optical filter comprising;
a means for splitting a light beam into two equally polarized light beams of predetermined polarization;
an optical substrate;
a filter element positioned on a back surface of the substrate along an optical path of each of said two equally polarized light beams;
a reflective element positioned on a front surface of the substrate along optical paths of intermediate stop beams produced by reflection of a portion of each of said two equally polarized light beams; and
means for rotating said substrate to vary an angle of incidence of each of said two equally polarized light beam, thereby allowing tuning of the optical filter.

18. The filter of claim 17, further comprising first means for retro-reflecting pass beams produced by transmission through the filter element of a portion of each of said two equally polarized light beams; and second means for retro-reflecting throughput stop beams produced by reflection of said intermediate stop beams on the reflective element.

19. The filter of claim 18, wherein each of said first and second retro-reflecting means includes an optical roof element that produces a lateral shift in retro-reflected pass beams and retro-reflected stop beams emerging therefrom.

20. The filter of claim 18, wherein one of said first and second retro-reflecting means includes an optical roof element that produces a laterally shifted beam from either said pass beams or said stop beams; wherein the other of said first and second retro-reflecting means includes a mirror; and wherein the filter further includes an optical circulator adapted to separate said equally polarized light beams from reflected beams produced by said mirror.

21. A method of tuning an optical filter while maintaining a direction of propagation of a stop beam produced by the filter, comprising the following steps:
providing a filter element positioned along an optical path of an incident light beam;
providing a reflective element positioned at a predetermined fixed angle with respect to the filter element along an optical path of an intermediate stop beam produced by reflection of a portion of the incident light beam on the filter element; and
rotating said filter and reflective element to vary an angle of incidence of said incident light beam, thereby allowing tuning of the optical filter while maintaining the direction of propagation of a stop beam produced by the filter.

22. The method of claim 21, further comprising the step of polarizing said incident light beam prior to incidence on the filter element.

23. The method of claim 21, further comprising the step of retro-reflecting a pass beam produced by transmission through the filter element of a portion of the incident light beam.

24. The method of claim 21, further comprising the step of retro-reflecting a throughput stop beam produced by reflection of said intermediate stop beam on the reflective element.

25. The method of claim 21, further comprising the steps of retro-reflecting a pass beam produced by transmission through the filter element of a portion of the incident light beam, and retro-reflecting a throughput stop beam produced by reflection of said intermediate stop beam on the reflective element.

26. The method of claim 21, further comprising the steps of polarizing said incident light beam prior to incidence on the filter element; retro-reflecting a pass beam produced by transmission through the filter element of a portion of the incident light beam; and retro-reflecting a throughput stop beam produced by reflection of said intermediate stop beam on the reflective element.

27. A method of tuning an optical filter comprising the following steps:
splitting a light beam into two equally polarized light beams of predetermined polarization;
directing said equally polarized light beams into an optical substrate;
placing a filter element on a back surface of the substrate along an optical path of each of said two equally polarized light beams;
placing a reflective element on a front surface of the substrate along optical paths of intermediate stop beams produced by reflection of a portion of each of said two equally polarized light beams; and rotating said substrate to vary an angle of incidence of each of said two equally polarized light beam, thereby allowing tuning of the optical filter.

28. The method of claim 27, further comprising the step of retro-reflecting pass beams produced by transmission through the filter element of a portion of each of said two equally polarized light beams; and retro-reflecting throughput stop beams produced by reflection of said intermediate stop beams on the reflective element.

29. The method of claim 28, wherein one of said first and second retro-reflecting means includes an optical roof element that produces a laterally shifted beam from either said pass beams or said stop beams; wherein the other of said first and second retro-reflecting means includes a mirror; and wherein the filter further includes an optical circulator adapted to separate said equally polarized light beams from reflected beams produced by said mirror.

30. The method of claim 28, wherein each of said first and second retro-reflecting means includes an optical roof element that produces a lateral shift in retro-reflected pass beams and retro-reflected stop beams emerging therefrom.

* * * * *